April 25, 1939.  W. N. McFAUL  2,156,022
POPPING BUCKWHEAT
Filed March 26, 1938

INVENTOR
Warner N. McFaul
By Ralph Burch

Patented Apr. 25, 1939

2,156,022

UNITED STATES PATENT OFFICE 2,156,022

POPPING BUCKWHEAT

Warner Nelson McFaul, Consecon, Ontario, Canada

Application March 26, 1938, Serial No. 198,329

1 Claim. (Cl. 99—81)

This invention relates to new and useful process for manufacturing popped buckwheat into a food product and providing an edible cereal in various forms from the natural buckwheat grain.

The primary object of the invention is to manufacture a food product from popped buckwheat by a heating process to remove the hulls and retain the kernel which makes an easily digested food, rich in vitamins and pleasant to taste.

A still further object of the invention is to manufacture a food product from buckwheat by popping the same in conjunction with other cereals as corn or the like to provide a palatable table food.

A further object of the invention is to provide a popped buckwheat as a food containing:

| | |
|---|---|
| Moisture | 5.52 |
| Protein (N × 6.25) | 12.40 |
| Fat | 2.53 |
| Carbohydrates | 76.29 |
| Fibre | 1.39 |
| Ash | 1.87 |
| | 100.00 |

Further objects of the invention are to extend the use of buckwheat as a human food, to increase the commercial value of this grain which is grown very successfully in the United States and Canada and to provide a new and useful food product that is both tasty and healthful.

Heretofore buckwheat has been more or less overlooked as a cereal but has been used as an article of food for human consumption in other ways such as buckwheat flour and with other ingredients in soups, cakes, etc., wherein the whole grain has been crushed, then the black hulls removed by fanning process. Other manufacturing processes have included water or vapour softening of the hard triangular black hulls. This process removes a considerable amount of the protein from the grain and leaves the same in pasty condition. The kernel has also been found to discolour by this process and after having been subjected to water or vapour treatment it loses its resistance quality against various forms of micro-organic disease and is therefore, subject to more rapid deterioration when stored than some of the other well known cereal grains.

Buckwheat contains protein of higher nutritive value than most other grains but 40% thereof is water soluble and is therefore lost in the water softening process. It will be readily understood therefrom that the grain must be used whole and in its natural state in order to retain the valuable nutritious food elements contained therein. The hull, which is only valuable in fibre content evidently must be removed by some other method that will not injure the food content of the kernel and must be free from the use of chemicals which would detract from the natural food value, or taste of the product.

In the process about to be disclosed several varieties of buckwheat have been tried including Japanese, Japanese Virginia, buckwheat rye, and Silverhull; these were supplied by the Central Experimental Farm, at Ottawa, Canada, and were of good quality. All the varieties popped when subjected to the treatment but the best results were obtained with the Silverhull, which is the more common variety and has been grown extensively in United States and Canada, for many years.

In the drawing appended hereto

Figure 1:
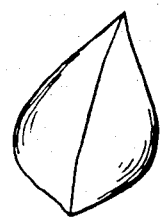
Fig. 1 shows a grain of buckwheat in its natural state.
Figure 2:
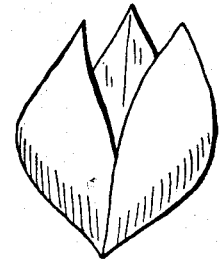
Fig. 2 shows the hull after the kernel has popped out.
Figure 3:
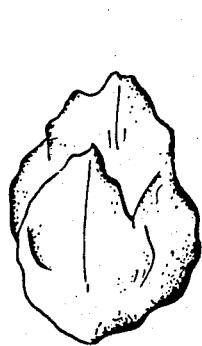
Fig. 3 shows the kernel partially popped.
Figure 4:
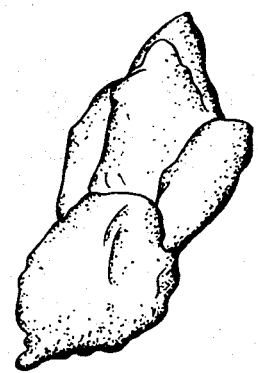
Fig. 4 shows the same fully popped.

The mode of utilizing the invention is as follows:

In the process a good grade of large buckwheat is used and is placed into a device such as a drum or pan which is heated to a predetermined heat of approximately 200 to 400 degrees Fahrenheit. The heat causes the kernel of the buckwheat to expand, due to the action or vaporization of the moisture therein, until it "pops" or breaks out of the hull and bursts. The hull is completely removed from the kernel by this process and is now ready to be separated. The food content or value of the kernel is in no way affected by the action and is now free from the hull and expanded to about four times its normal size and appears as a light and white substance.

The next step in the process is the separation of the hulls and the kernels. This is accomplished by passing the entire contents of the heating device over a screen of suitable size to permit the hulls to pass through. The kernels which are now popped buckwheat, pass over the screen to a receptacle provided therefor, and are also subjected to further cleaning by a fan which blows all the smaller particles into a separate receptacle leaving the popped buckwheat clean and free from all foreign substance.

The hulls together with such particles which are removed by screening and fanning including such whole grains which do not pop during the prescribed time in which the grains are in the heating device, are collected in a common receptacle and are later passed through a grinder and made into a meal to be used for stock food. There may be a small percentage of hulls which do not leave the kernel completely, these hulls may be removed by light friction.

The kernels of the popped buckwheat as manufactured to this state may be used in a variety of ways. It may be served as a cereal in its present state with sugar and cream as it requires no cooking. Unlike popcorn it is free from all traces of the hull. It may be added to soup, broth, etc., just before serving and makes a suitable and tasty filler.

The popped buckwheat may also be used in making various kinds of cookies, cakes, biscuits and macaroons and the like wherein the natural flavour of the buckwheat enhances the confection.

The process is further continued to provide a commercial confection by the addition of brown sugar and water. The sugar and water are mixed and allowed to boil until the syrup formed thereby is of the right consistency to spin a thread when drained off a spoon. The syrup is then applied to the popped buckwheat and mixed, after which it is placed in the moulds or shaped into blocks, bars, cakes, etc., and when allowed to cool it will remain in the desired shape. This confection besides having a fine pleasing flavour is both appetizing and healthful.

It is well known that certain other cereal grains such as rice, wheat, corn, etc., have been subjected to somewhat similar treatment as described herein but it is believed to be new to provide an edible cereal from buckwheat as described in the foregoing process. As the buckwheat is recognized as one of the richest of grains the popped buckwheat may be successfully and effectively blended with other cereals as follows:

|  | Percent |
|---|---|
| Popped buckwheat | 75 |
| Puffed Wheat | 25 |
| Popped buckwheat | 75 |
| Puffed Rice | 25 |
| Popped buckwheat | 75 |
| Puffed Oats | 25 |

In addition to the process of popping separately and mixing with other cereals the buckwheat in its natural state may be mixed with a prescribed quantity of one or more other cereals and the mixture popped at one operation and the hulls separated therefrom. This latter process may vary the resultant food product in taste and appearance and provide a variety in the finished article.

It is believed that the process has been sufficiently described in the foregoing paragraphs that the advantages thereof and the product obtained thereby will be apparent without further detailed description.

I claim:

The method of making a food product consisting in heating unhulled buckwheat grain to a temperature of between 200° and 400° F. to cause complete popping of the grains whereby the kernels are burst open and the hulls separated therefrom.

WARNER NELSON McFAUL.